United States Patent [19]

Bechtiger

[11] 4,128,237
[45] Dec. 5, 1978

[54] CARD INPUT DEVICE FOR PRECISION PUNCHING OF CARDS

[75] Inventor: Charles G. Bechtiger, Colombier, Switzerland

[73] Assignee: Relhor S.A., La Chaux-de-Fonds, Switzerland

[21] Appl. No.: 809,387

[22] Filed: Jun. 23, 1977

[30] Foreign Application Priority Data

Jul. 6, 1976 [CH] Switzerland .................. 8665/76

[51] Int. Cl.² .............................................. B65H 9/12
[52] U.S. Cl. ...................................... 271/241; 346/86; 346/95
[58] Field of Search ............... 271/8 A, 241, 243, 244, 271/238; 346/86, 95

[56] References Cited

U.S. PATENT DOCUMENTS

| | | | |
|---|---|---|---|
| 831,498 | 9/1906 | Bundy | 346/86 |
| 3,019,074 | 1/1962 | Leeser | 346/85 |
| 3,030,013 | 4/1962 | Moodie | 346/83 X |
| 3,611,423 | 10/1971 | Rutsche | 346/86 |
| 3,978,493 | 8/1976 | Trischler | 346/86 X |

Primary Examiner—Richard A. Schacher
Attorney, Agent, or Firm—Flynn & Frishauf

[57] ABSTRACT

A card guideway frame is movable in the width direction of a card to select the column in which a hole is to be punched and the card insertion depth is variable to determine the spacing between the bottom edge of the card and the hole. The insertion depth is set by a stop passing through the wide aperture of the guideway frame and a carriage resting on a projection of the stop and movable along the length of the guideway frame with the stop carries a pair of guide plates having a narrow slit between them for the card and practically filling the aperture in the frame, so as to constrain the card into a flat shape, correcting any arching and resisting any bending from insertion forces, even though the frame restrains only the extreme edges of the card at the sides of the working area. The carriage also carries a check stop which allows the card to be inserted all the way to the insertion depth control only if the card is presented with a cut corner at the correct side of the bottom edge and in that case an electrical contact is provided to initiate the punching operation.

4 Claims, 2 Drawing Figures

CARD INPUT DEVICE FOR PRECISION PUNCHING OF CARDS

CROSS REFERENCE TO PRIOR PATENT

U.S. Pat. No. 3,611,423, issued Oct. 5, 1971, to Karl Rutsche.

CROSS REFERENCE TO RELATED APPLICATIONS OF PRESENT INVENTOR

Ser. No. 807,180, filed June 16, 1977 and since abandoned; Ser. No. 807,179, filed June 16, 1977 and since abandoned, and Ser. No. 809,388, filed June 23, 1977 and since abandoned.

This invention concerns a card input device for a data card punch, and particularly a device comprising a card guideway frame of variable card insertion depth that is movable relative to a fixed card punch location in a direction transverse to the card insertion depth dimension. Cards of the type commonly used for recording data can be punched in such card input devices in the manner required for recording in business establishments the attendance or working time of personnel or the operation time of machinery or processes. In such applications it is essential to utilize the punched card as efficiently as possible as a data carrier. Efforts are accordingly made to maximize the effective working surface kept clear for punching. The holes are produced by a punch and die, the punch being pressed through the card into the die. Since the card guideway frame, which is sometimes referred to as the card funnel because of its diverging mouth, is movable relative to the punching tools, the punch must have free access over the entire working field of the data card. For this reason the data card can be guided in the card guideway frame only at its edges, which is to say outside of its working surface. That, however, permits only narrow guides at the edges of the card.

The data card is usually inserted in the card guideway frame by hand until its front (bottom) edge comes to rest against a stop. According to the magnitude of the pressure applied to the card at the end of the insertion path, there is a certain risk that the card will bend and even jump out of the lateral guides. On the other hand, it is important to provide as precise as possible a disposition of the data holes for the automatic interpretation by machinery of the holes punched in the data cards. The exact hole position is of particular importance in data processing in which the distance between two successively punched holes in a card provide a direct measure for the time elasped between the punching events. A stop for the bottom edge of the card, which stop is readily adjustable in height, determines the spacing of these punched holes from the bottom card edge, but the distance from the bottom edge of the card can only be precisely predetermined position only if the card does not bend. These various requirements, however, are contradictory: a wide work surface permits only a narrow guideway along the card edge, so that the risk of bending when the card comes up against the stop is correspondingly great, a result which works against the requirement of a high precision of the location of the hole that is then to be punched.

It is an object of the present invention to provide a movable card input device for a data card punch in such a way that the bending (arching) of the card is prevented or kept as small as possible and that at the same time the largest possible surface should be kept clear and made available for punching holes in a card. And of course, the position of the card relative to the punching unit must be variable in two mutually perpendicular directions.

SUMMARY OF THE INVENTION

Briefly, a carriage movable rectilinearly relative to the card guideway frame is provided which carries at least one pair of card guide members for accepting and guiding an end portion of an inserted card, between which paired members a card-accepting slit is provided, and also a card stop that is rectilinearly movable with precise position control, by means for setting the card insertion depth, is disposed in such a manner as to cause the carriage to move together with the card stop in the direction in which the card stop is movable.

A check member which would stop the card at one corner before the bottom edge reaches the normal card stop unless that corner is cut away, indicating correct positioning, is also provided on the carriage. It is then possible to provide electrical contacts mounted on the normal card stop which will be actuated by the front edge of an inserted card only when the card is inserted in the correct position.

The invention is further described by way of illustrative example in the annexed drawing, in which.

Figure 1:
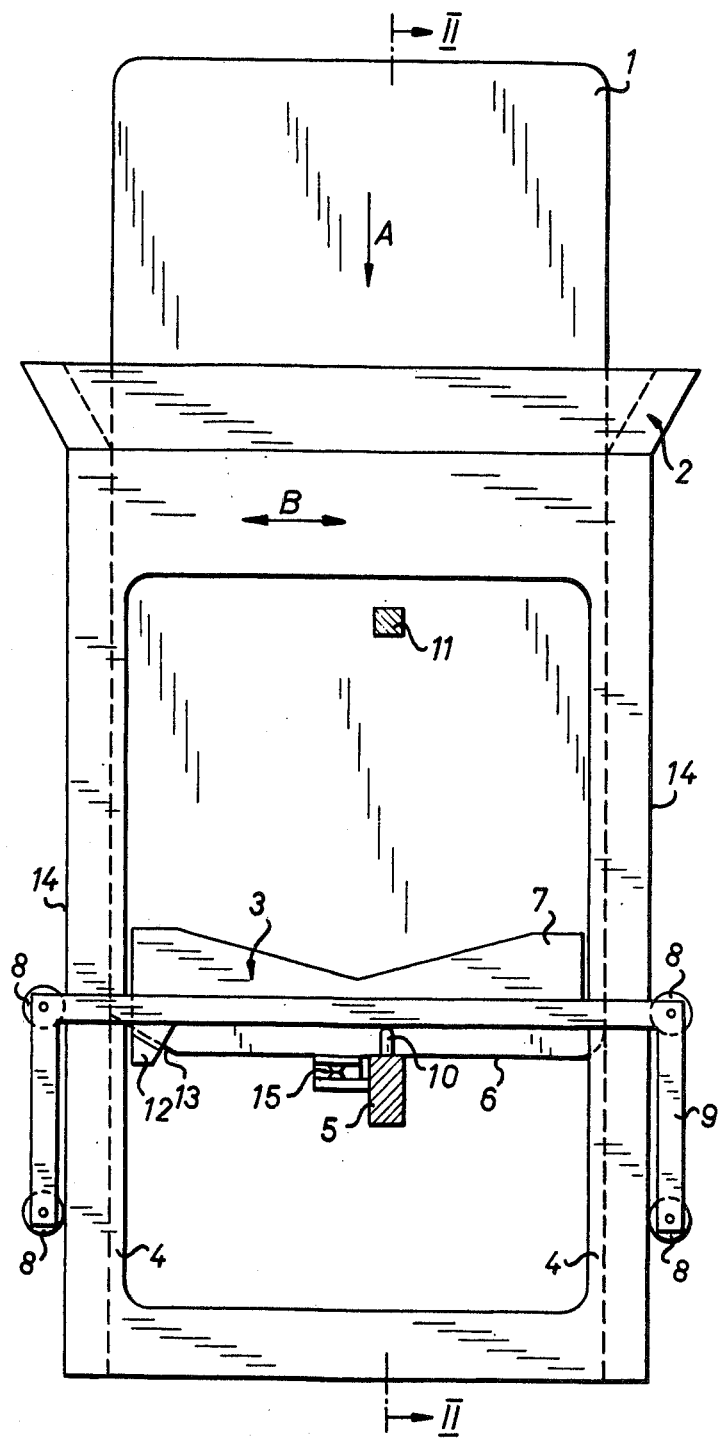
FIG. 1 is an elevation view of the card input device of this invention.
Figure 2:
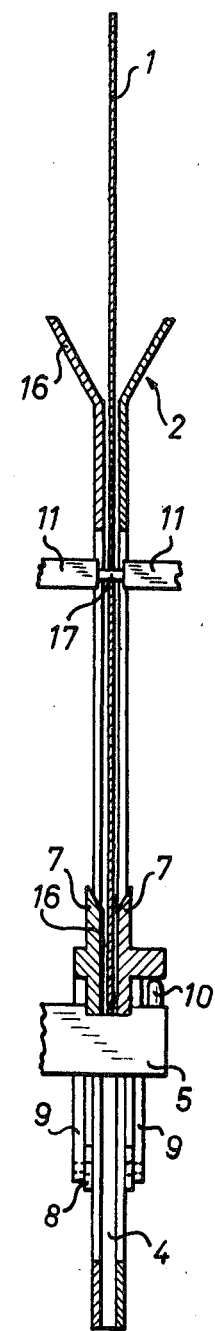
FIG. 2 is a section through the same device in a plane intersecting the plane of FIG. 1 at the line II—II.

The card input device represented in FIGS. 1 and 2 is a component of a card punching device such, for example, as the one described in U.S. Pat. No. 3,611,423. A data card 1 is designed to be inserted in the direction of the arrow A into the card guideway frame or card funnel 2. The card guideway frame 2 is from time to time shifted in one or the other of the directions designated by the double arrow B, by means of a drive mechanism not shown on the drawing since the nature of such drive mechanisms is well understood. In the system disclosed in U.S. Pat. No. 3,611,423, movement in one of the directions B by such a drive mechanism selects a column of a card in which a hole will be punched.

The data card 1 is guided by guide channels 4 along both of its vertical edges. These guide channels 4 are relatively shallow, which is to say only very narrow guide strips on the sides of the guide channel restrain the faces of the card, so that a large working surface remains free for the punching of holes through the card, as is plain in FIG. 1 where the vertical shading shows the surface of the card 1 and the horizontal shading shows the surface of the card guideway frame. The large opening in the guideway frame through which the surface of the card is visible is clearly shown in the drawing.

A stop 5 that is movable in the vertical direction limits the insertion length of the card 1 as soon as the bottom edge 6 of the card comes to lie against this stop. Before the data card 1 reaches the stop 5, however, it is pushed between two horizontal guide rails 7. These guide rails 7 are so made that a slit 16, only a little wider than the card thickness, remains clear between the guide members 7, so that the card can pass clear through between them to reach the stop 5. In this manner a card inserted in the slit 16 is forcibly flattened if it was previously arched. The guide rails 7 hold the card 1 inserted in the slit 16 exactly in the predetermined required position.

The two guide rails connected are connecte through an essentially U-shaped carriage 3 that is displaceable in height. The carriage 3 is provided with four rollers 8 or equivalent sliders to allow it to be displaced along the length of the card guideway frame 2. The two lower rollers 8 are each journaled in an arm 9 running parallel to the guide surfaces 14 on which they respectively roll so that canting of the carriage 3 may be prevented. The carriage 3 rests on a stud or pin 10 that projects from the stop 5.

The stop 5 is movable in the vertical direction by means of a drive such, for example, as a lead screw drive in which a drive motor produces steps of partial rotation of the lead screw by one pulse every minute of time, as described in the above mentioned U.S. Pat. No. 3,611,423. In this manner there results a very high position precision of the holes produced in the data card 1 by the fixed-position hole punching unit 11,17. By means of the stud 10 the carriage 3 is continuously held at a constant spacing from the bottom edge 6 of a card and in addition the card 1 is constrained into precisely determined plane and is stiffened in that position.

Since there is a constant spacing between the two guide rails 7 and the bottom edge of a card that does not change with the position of the carriage 3, the carriage can also be utilized to recognize whether the card is inserted right side to. The data card 1 is provided in the usual way with a corner cut 13 to identify its position for detection of inadvertent reversals. In the illustrated case the cut corner must be at the left of the bottom of the card. A check stop 12 is provided on the carriage 3 at the left end of the slit 16 which is designed to cooperate with the corner cut 13 of the data card 1. If the card 1 is inserted into the card guideway frame 2 so that the corner cut 13 is on the same side as the check stop 12, the card 1 can be inserted unhindered all the way to the stop 5 and in this position it can actuate an electrical contact 15 in order to initiate the card punching operation. In this case the trimmed corner 15 of the card 1 does not touch the check stop 12. When the card 1 is inserted in any other position, the check stop 12 blocks the insertion of the card 1 before it reaches the stop 5 and the contact 15. Improper insertion of the card in the card guideway frame 7 thus cannot actuate the contact 15 and the punching operation is held off. The rejection of an improperly inserted card can thus be produced in a simple way.

Although the invention has been described with reference to a particular illustrative example, it will be understood that modifications and variations may be made within the inventive concept. For example, instead of an arrangement such as illustrated with a vertical card insertion direction, a comparable device can be provided with a horizontal card insertion direction. The modifications of the structure illustrated involved in providing a device for horizontal card insertion will be readily understood without any further explanation.

I claim:

1. A card input device for a data card punch comprising a card guideway frame of variable card insertion depth, which frame is movable relative to a fixed card punch location in a direction transverse to the card insertion depth dimension, and comprising the improvement wherein, for controlling card insertion:

a carriage (3) movable vertically relative to the card guideway frame (2) is provided, which carries at least one pair of card guide members (7) for accepting and guiding an end portion of an inserted card, between which paired members (7) a card accepting and constraining slit (16) provides a vertical through-passage between said members for a card, and means (5) for limiting vertical card position that are vertically movable for setting the card insertion depth and are not part of nor affixed to said carriage are disposed below said guide members of said carriage in such a manner as to cause the carriage to move together upwardly with said means.

2. A card input device as defined in claim 1, in which said vertical card position limiting means (5) has the form of a card stop controlled precisely in vertical position by mechanical positioning means and in which said carriage (3) is provided on each side of said card guideway frame (2) with at least two means (8) for allowing relative vertical movement while maintaining a fixed lateral relation and is thereby movable along guide members (14) of said card guideway frame.

3. A card input device as defined in claim 1, in which there is provided a card position checking stop (12) mounted on said carriage (3) located on that side of said guideway frame at which a forward edge on inserted card should normally have a cut-away corner, and in which, further, electrical contact means (15) actuatable by the front edge (6) of an inserted card for detecting the presence of a correctly inserted card are provided near said card stop (5).

4. A card input device as defined in claim 2, in which said carriage (3) has a U-shaped configuration and each of the parallel legs (9) of the U formed by the carriage is provided with at least one of said means (8) for allowing relative vertical movement while maintaining a fixed lateral relation and is thereby movable along guide members (14) of said card guideway frame.

* * * * *